Figure 1:
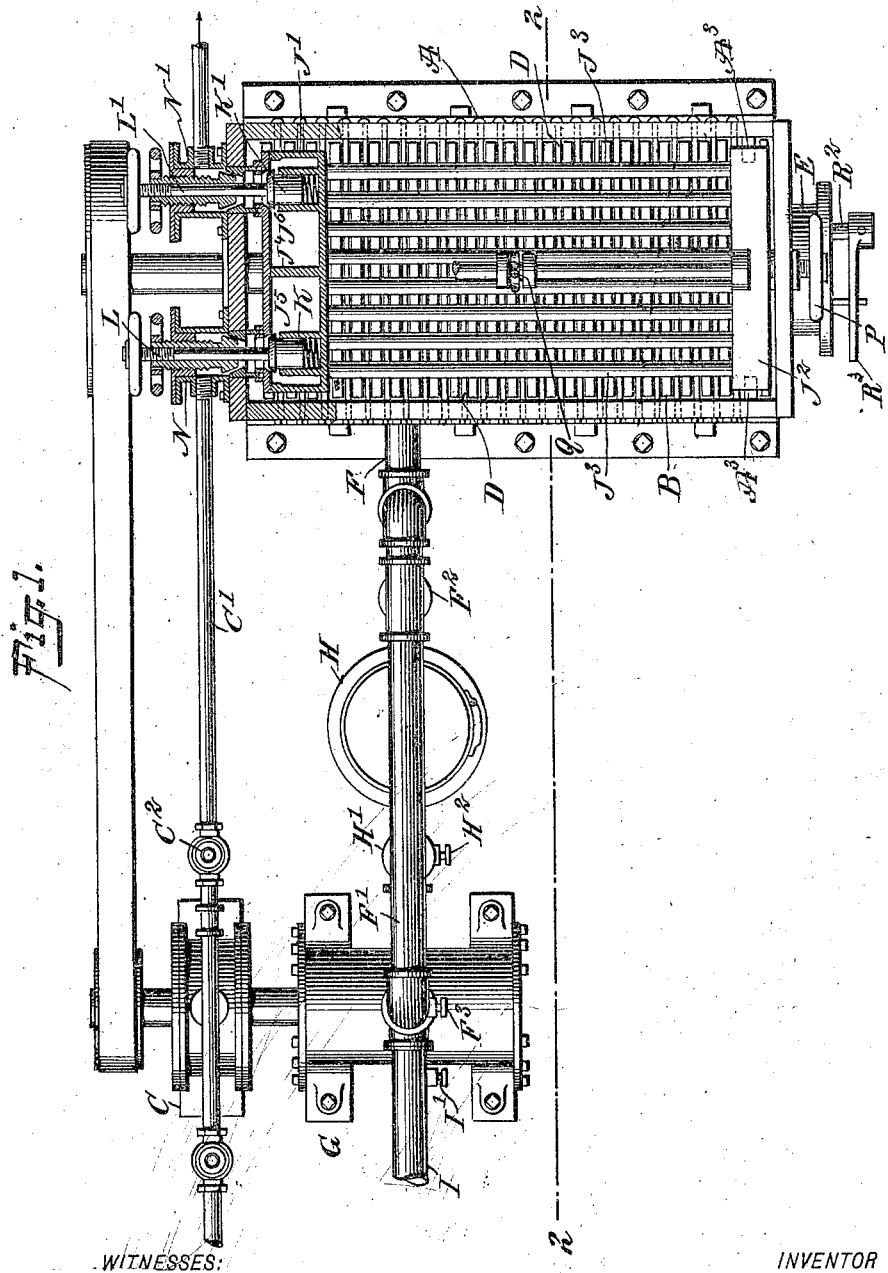

J. McINTYRE.
PROCESS OF TREATING MILK.
APPLICATION FILED OCT. 30, 1905. RENEWED OCT. 11, 1911.

1,026,756.

Patented May 21, 1912.

2 SHEETS—SHEET 1.

WITNESSES:

INVENTOR
John McIntyre
BY
ATTORNEYS

J. McINTYRE.
PROCESS OF TREATING MILK.
APPLICATION FILED OCT. 30, 1905. RENEWED OCT. 11, 1911.

1,026,756.

Patented May 21, 1912.

2 SHEETS—SHEET 2.

WITNESSES:

INVENTOR
John McIntyre
BY
ATTORNEYS

UNITED STATES PATENT OFFICE.

JOHN McINTYRE, OF JERSEY CITY, NEW JERSEY, ASSIGNOR, BY MESNE ASSIGNMENTS, TO WATKIN M. GRIFFITH, OF FREEPORT, LONG ISLAND, NEW YORK.

PROCESS OF TREATING MILK.

1,026,756.  Specification of Letters Patent.  Patented May 21, 1912.

Continuation of application Serial No. 162,031, filed June 18, 1903. Renewed May 31, 1905, Serial No. 259,827. This application filed October 30, 1905, Serial No. 285,175. Renewed October 11, 1911. Serial No. 654,164.

*To all whom it may concern:*

Be it known that I, JOHN McINTYRE, a citizen of the United States, and a resident of Jersey City, in the county of Hudson and State of New Jersey, have invented a new and Improved Process of Treating Milk, of which the following is a full, clear, and exact description.

This invention relates to the extraction of the aqueous portion of milk and other liquids and substances, until dry solids are produced.

The object of the invention is to provide a new and improved process for treating milk, whereby the milk is concentrated and formed in one continuous operation into separate solid particles in the form of powder and granules, from which, by the addition of water and the application of heat, milk can be reconstructed that is akin or practically true to the original milk in color, solubility, natural souring and coagulating by the rennet test.

In order to produce the desired result, I proceed in detail as follows: The milk to be treated and contained in an open vessel is heated, and at the same time highly heated air, under pressure, is passed through the milk under a constant mechanical agitation of the milk and the highly heated air, to divide the milk and the highly heated air to the minutest degree and cause an intercommingling of the air and milk particles, to insure a rapid evaporation of the aqueous portions of the milk. The highly heated air is preferably passed into the milk at the bottom of the open vessel in an uninterrupted jet extending the entire length of the bottom of the vessel, and in the lower portion of the vessel is mounted a constantly revolving stirrer or agitator, arranged to stir or agitate the heated milk and the highly heated air, so that both are divided and their minutest particles brought into intimate contact with each other, for the highly heated air to carry off the moisture through the open top of the vessel and thereby insure a rapid concentration of the milk and a division thereof into dry, solid and soluble particles in the form of powder, grains and granules which, by the addition of water, and the application of heat, can be reconstructed into milk akin or practically true to the original milk in color, solubility, natural souring and coagulating by the rennet test.

In order to successfully produce the product described, the process is carried on in one vessel at a single operation, under three essential conditions, namely, that the air jet is maintained uninterruptedly from the beginning to the end of the operation, that the milk is kept above a temperature of 90° F., and that dormancy of the milk is wholly prevented, as otherwise fermentation or souring of the milk and consequent insolubility will occur.

In practice, I have obtained the desired result by employing as a heating medium for the milk a steam coil, immersed in the milk immediately above the mechanical agitator or stirrer, and by introducing the air at about a temperature of 216° F., and this is maintained during about three-fifths of the whole time required for obtaining the product, and during this first period of the process the milk is concentrated to a thick milk consistency, and notwithstanding the high temperature of the introduced air and coil, solubility of the solids of the milk is not lessened. At this period, the heating medium (coil) is bodily removed, and the milk is now reduced to a doughy consistency, and the air is introduced during this period, at a temperature of about 190° F., and the period lasts about one-fifth of the whole time of the process. From this doughy state of the milk, until the latter crumbles, the temperature of the heated air is kept at 190° and the state of crumbling is reached in about one-tenth of the time of the whole process, and from this stage until the finished product is obtained the heated air is passed into the milk product at 170° F., and this last stage of the process takes about one-tenth of the time of the whole process.

A moderate rise or drop in the temperature mentioned does not affect the perfection of the concentrates of the milk, provided the hot air is of sufficient volume to prevent the temperature of the milk or its product falling below 90° F. at any stage of the process, but the more rapid the concentration the better the product, and hence the approximate maximum temperature of the air as above given are preferred.

As previously stated, it is essential that no portion of the milk remains dormant during the last portion of the operation, and by mechanically agitating or stirring both the milk and the air dormancy of the milk is avoided and an intimate contact of the milk and air particles is obtained, and the air, at the high temperature, absorbs rapidly and carries away large amounts of the aqueous portion of the milk, without practical injury to the solids in the milk, notably preventing a coagulation of the albuminous matter. At the end of the last period of the process, the heated air is shut off and the stirrer is stopped, to allow of removing the product from the vessel, the product being now in condition for the market. If for commercial or other reasons it is desired to have the solid milk particles of a uniform size, then the product, after being removed from the vessel, may be run through a grinder.

In carrying out the process I prefer to use an apparatus such as shown in the accompanying drawings forming a part of this specification, in which similar characters of reference indicate corresponding parts in both views.

Figure 2:
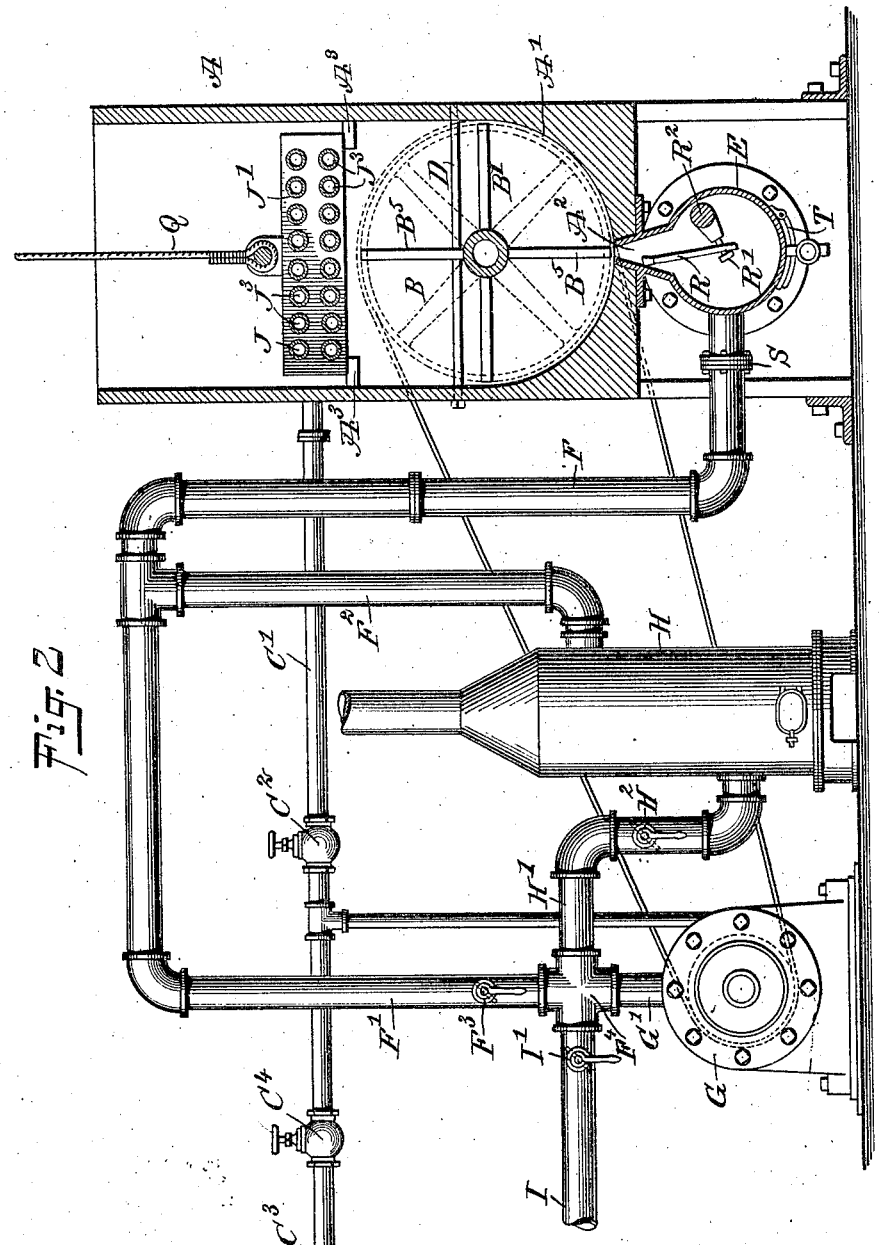

Figure 1 is a plan view of the apparatus, parts being shown in section; and Fig. 2 is a sectional side elevation of the same, on the line 2—2 of Fig. 1.

The vessel or tank A, as shown, is of rectangular shape, open at the top and having a semi-circular bottom A', provided throughout its length and preferably at the lowest portion, with an air induction port A², for the introduction of heated air under pressure. In the bottom portion A' of the vessel A is mounted to turn a stirrer or agitator B, driven from an engine C or other motor, and arranged to sweep with the end of its arms the inner surface of the semi-circular bottom A' of the vessel A, to prevent adherence of the milk to the bottom, and in order to scrape the doughy milk from the arms of the stirrer or agitator B, scrapers or interceptors D are provided, fixed in the vessel A and extending transversely between the arms of the stirrer, as plainly indicated in Fig. 2. The air induction port A² connects with an air chamber E, into which opens an air supply pipe F, having branch pipes F' and F², of which the branch pipe F' is provided with a valve or damper F³, and connects by a cross F⁴ with the discharge pipe G' of a blower G or like device, for furnishing the compressed air needed in the process. The cross F⁴ is connected by a pipe H', having a valve H², with a heater H of any approved construction and from which leads the branch pipe F², so that air forced by the blower G through the pipe G', cross F⁴ and pipe H' into the heater H is heated in the latter, and passes in this heated condition through the pipe F² and F into the air chamber E. An air inlet pipe I, having a valve or damper I', also connects with the cross F⁴, and through this pipe the air from the compressor may be discharged when the valves H² and F³ are closed, and the valve I' is open. The valve F³ may be opened, so that a portion of the air from the blower G passes through the pipe F', to mix with the heated air coming by the branch pipe F² from the heater H, to reduce the temperature of the air passing into the air chamber E. Thus by the operator manipulating the valves H² and F³, heated air to the desired degree may be passed into the air chamber E.

The coil J for heating the milk consists essentially of two heads J' and J², connected with each other by circulating pipes J³, and the said heads are adapted to rest on lugs or other supports A³, fixed in the vessel A (see Fig. 2). One of the heads, as shown in the head J', is provided with a lengthwise partition J⁴, to form an inlet chamber J⁵ and an outlet chamber J⁶, the chambers having normally closed spring-pressed valves K and K', adapted to be opened by screw plugs or plungers L and L', under the control of the operator and extending through a steam inlet pipe N and an exhaust pipe N' respectively, to the outside, as plainly indicated in Fig. 1. The inlet pipe N connects with the exhaust steam pipe C' of the engine C, or the said inlet pipe N may connect with another source of steam supply.

The pipe C' is provided with a valve C², for controlling the flow of the steam through the coil J, and the said pipe C' is provided with a branch pipe C³, having a valve C⁴ for conducting the exhaust steam to the atmosphere whenever the valve C² is closed and the valve C⁴ is open, so that the exhaust steam, instead of passing to the coil J, passes into the air.

The pipes N and N' have their terminals in one wall of the vessel A, and in order to bring the coil into proper position relative to the pipes N and N', the screw rod P screws in the opposite wall of the vessel A, against the head J², to move the coil into connecting position with the pipes N and N'. Now when the coil is in this position, the operator first opens the chamber valves K and K' by screwing the plungers L and L' inwardly, so that when the valve C² is opened, steam passes through the chamber J⁴ and its pipes into the head J², and from the latter back by the pipes of the chamber J⁶ into the latter, and through the pipe N' to the outer air. Thus steam is circulated through the coil to heat the latter and the milk in which the coil is immersed.

The coil J is connected at or near its middle with a cable Q, forming part of a hoisting device (not shown), to permit of lowering the coil J into position on the supports A³ for connecting with the steam supply, the said hoisting device also serving to bodily lift the coil J out of the milk after the latter has reached about a creamy consistency, and the further services of the coil are dispensed with during the rest of the operation, as previously explained.

It is understood that immediately previous to the removal of the coil J from the vessel A, the valve C² is closed and the plungers L and L' are retracted, to allow the valves K and K' to seat themselves by the action of their springs, so as to close the chambers J⁵ and J⁶ and thereby prevent the milk from entering the coil. After the valves K and K' are closed, the screw rod P is unscrewed, to release or unclamp the coil J, to allow its being hoisted by the cable Q out of the milk and the vessel A. During the removal of the coil J, the stirrer B is kept in continuous action and heated air is uninterruptedly forced through the induction port A² into the milk, it being understood that by arranging the coil above the stirrer the coil can be readily removed at the desired time, without interfering with the action of the stirrer and the compressed heated air.

The removal of the coil J at the time specified is desirable, to prevent the adherence and dormancy of the thickening milk on the surface of the coil, as such adhering product would sour and spoil the batch, especially as the milk is now rapidly concentrating to a doughy state. During this transition period, and to the end of the operation, the highly heated air supplies sufficient heat to the concentrating milk to keep the same above 90° F., to insure the formation of a perfect product.

In order to keep the induction port A² at all times free from any particles of the milk, a wiper or valve R is provided, held on the crank arm R' of a rock shaft R², extending lengthwise in the air chamber E and passing through, and journaled in the two heads thereof. On one outer end of the rock shaft R² is secured a handle R³ adapted to be taken hold of by the operator, to permit the latter to impart a rocking motion to the shaft R², to move the wiper R up or down in the induction port A², to clean the same of any solid matter that may adhere to the port. Furthermore, the wiper may serve as a valve to partially close the port A² whenever it is desired to increase the air pressure. The valve may also be used to completely close the port, to retain the milk product within the vessel A, in case the air is shut off from the chamber E. A strainer S is placed in the air supply pipe F, to prevent any impurities from being carried along by the air into the air chamber and the milk.

Now when the apparatus is in operation and the milk is poured into the vessel A until the coil J is submerged, then the stirrer or agitator B causes an intimate intermingling of the heated air and the heated milk, and no particle of the latter is allowed to remain dormant, and hence a very rapid concentration of the milk and the final formation thereof into solid, practically soluble and separated particles in the form of grains or granules and powder is the result, the entire process being carried out in a single open vessel and at one continuous operation.

In order to allow convenient removal of the finished product from the vessel A, the air chamber E is provided with an air-tight door T which when opened, after the air blast is shut off and the stirrer B ceases its rotation, allows the finished product to drop through the induction port A² into the air chamber and through the open door T into a receiving receptacle.

It will be seen that in my process, the milk is wholly superimposed to the entering heated air and that, therefore, the heated air enters the milk during the whole process at the most effective point. And, besides, it is entered over the whole length of the milk and immediately broken and thoroughly diffused in the whole body of the milk by the smasher, and the evaporation is expedited thereby and the solubility of the product improved. By entering the air at the bottom I avoid the baking and consequent injury of the product that occurs on pipes that convey heated air to the product downwardly inside of the tank, or that contact with the product at all; besides, air so entered is localized and less effective in preventing fermentation and less economic in drying than by my practice of immediate mechanical subdivision and diffusion of the whole volume of the heated air with the whole body of the milk.

From the foregoing it is evident that only a concentration tank whose contacting portion with the peripheral sweep of the stirrer is circular, and whose end or ends are also in sweeping contact with the end of the stirrer, will suffice, with the other means described, to prevent, as far as practicable, the dormancy in the product that would occur in any other form of tank, or dormancy of the product due to wrong formation of the tank. For instance, a rectangular bottomed tank, employing my other means, may be used till the product has attained a creamy density, but to obtain the perfect product it must then be transferred to and finished in a circular bottomed tank employing the means described; but for the reasons given it is preferable to do the whole operation in one tank.

In concentrating milk by my process, any temperature of the milk from 90° to 156° F. is perfectly safe till the product attains a creamy density, then from 90° to 120° F., to the dry finish of the product.

In the application of heat and air in reducing milk by evaporation to a dry solid, I find that continuous rapid mechanical stirring and smashing of the whole body of the milk by the mechanical stirrer presents a very large surface to the vapor absorbing air, as it is introduced to the milk in my process, to act upon, and this in a greater degree when the milk does thicken and rapid drying is most required; and when the milk has reached a doughy density, which condition maintains but a fraction of the whole time required for the process, the mechanical smasher rapidly subdivides it, incessantly exposing new surfaces to the heated vapor absorbing air, that in my process strikes the product in its lowermost portion over the whole length of the tank, until it is crumbly dry, then smashed to granules and powder and stirred and dried by heated air entering the product over its whole length at the most effective point, till dry, fit for grinding; thus continuously, without cessation, producing at every stage of the process new and finely subdivided surfaces of the product for the efficiently diffused heated vapor absorbing air to act upon and, practically, preventing dormancy and fermentation of the whole product, and thereby producing a product that, reconstructed milk therefrom is more akin to natural milk in color, rennet test, solubility and souring than reconstructed milk from any other dry milk solid known to commerce as far as I am aware.

The finished product is of about one-eleventh in weight and one-eleventh in volume of the original bulk of the milk, and by using the highly heated air and heating the milk as described, the entire process takes but a comparatively short time. The agitating of the milk and air by the stirrer B retards the thickening of the milk and keeps the latter filled throughout with air cells, and hence high temperatures in both the air and the heating medium (steam) in the coil can be employed without reduction of the temperature during the time the coil is immersed in the milk, and which time is about three-fifths of the whole time of the process. It is evident that the time required (say three and one-half hours) for this stage of the process may be reduced proportionately by increasing the volume of air and the heat employed, or in other words, by doubling the volume of air and quantity of heat practically the same work can be accomplished in about half the time.

It is expressly understood that the temperature of the air directly entering into the milk without cessation during the entire process is considerably above the temperature that coagulates albumen, and that the steam heated coil imparts to the milk contacting with it a temperature considerably above the temperature that coagulates albumen, but owing to the rapid change of position of the whole body of the milk, and the rapid minute subdivision of it, and the rapid minute diffusion in it of the air and heat, by my process, these high temperatures do not have time to act injuriously upon the milk.

Although I have herein shown and described the improvement more particularly for treating milk, it is evident that other liquids and substances may be treated in the same manner with a view to produce dry solids.

The apparatus shown and described herein is not claimed in this application but forms the subject matter of the application for Letters Patent of the United States, for an apparatus for drying milk, #285,174, filed by me on October 30, 1905, and the product produced by the aforesaid method and apparatus forms the subject matter of the application for Letters Patent of the United States, for a dry milk product, Serial No. 285,176, filed by me on October 30, 1905.

Having thus described my invention, I claim as new and desire to secure by Letters Patent:

1. The herein described process for producing solid milk in separated solid soluble particles, which consists in subjecting the milk in an open vessel to the action of a heating medium, directly under the level of the milk, and simultaneously passing highly heated air into the milk in an upward direction, and simultaneously agitating the heated air and the heated milk mechanically, below the heating medium, until the milk is reduced to an approximately creamy consistency, and then, without interruption, continuing the action of the highly heated air and mechanical agitation on the reduced milk under exclusion of the heating medium for the milk, the temperature of the milk being kept in excess of 90° F. during the entire operation.

2. The herein described process for producing solid milk in separated soluble particles, which consists in subjecting the upper portion of the milk, contained in an open vessel, to the action of a heating medium and simultaneously passing a jet of heated air into the bottom portion of the milk uninterruptedly, throughout the length of the said bottom portion, at the same time agitating the milk and the heated air mechanically throughout the bottom portion of the milk, until the milk reaches a creamy consistency, and continuing the mechanical agitation and the introduction of the heated air under exclusion of the heating medium, the temperature of the milk being kept in excess of 90° F. during the entire operation.

In testimony whereof I have signed my name to this specification in the presence of two subscribing witnesses.

JOHN McINTYRE.

Witnesses:
 THEO. G. HOSTER,
 EVERARD B. MARSHALL.